L. S. Hill,
Watchmakers Lathe,
Nº 99,191. Patented Jan. 25, 1870.
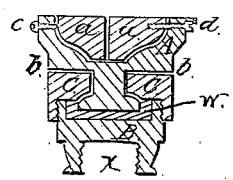
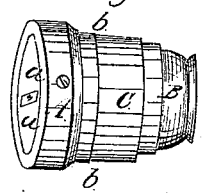
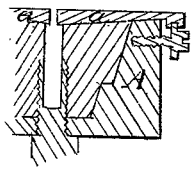
Witnesses:
O. Buddington
M. Metcalf
Inventor:
Lysander S. Hill

United States Patent Office.

LYSANDER S. HILL, OF GRAND RAPIDS, MICHIGAN.

Letters Patent No. 99,191, dated January 25, 1870.

IMPROVED JEWELLERS' CHUCK.

The Schedule referred to in these Letters Patent and making part of the same.

Be it known that I, LYSANDER S. HILL, of the city of Grand Rapids, in the county of Kent, and State of Michigan, have invented a certain new and useful Improvement in "Self-Adjusting Jewellers' Lathe-Heads;" and I do hereby declare that the following is a full and exact description thereof, reference being had to the accompanying drawings, and to the letters of reference marked thereon.

In the drawings—

Figure 1 is a perspective view of the lathe-head.

Figure 2 is a vertical section of the same, cutting the lathe-head through its centre.

Figure 3 is also a vertical section of a part of the same, showing one method of adjusting the movable jaws, by means of the set-screw $c$.

The object of this improvement is to furnish a jeweller's lathe, or lathe designed for fine work, with a neat, cheap, and convenient device, whereby a central and level position of the work may be readily secured, without soiling the same by contact with wax, as is done by the methods in common use.

The nature of my invention consists in providing the lathe-head with a suitable joint, at the base of which is a chamber, the latter supplied with wax, and the whole constructed and arranged in such a manner, that after placing the work within the lathe, the lathe-head is heated, thereby softening the wax in the chamber, when the lathe is set in motion, and a central and level position of the work obtained and fixed, by the usual well-known methods of a rest, and the cooling and hardening of the wax.

In order to enable others skilled in the art to make and use my invention, I will now proceed to describe its construction and operation.

A represents the outermost part or head-block of the lathe-head, provided with the ordinary jaws $a\ a$, for holding the work in the lathe.

B represents the rear portion of the lathe-head, furnished with the screw-socket $x$, for attaching it to the lathe, its opposite end provided with the chamber for the reception of the wax $w$.

C represents an annular rim, fitted loosely on to the lower and projecting portion of the head-block A, forming a joint on the latter, at the point $b$, and at its point of contact with the wax $w$, so as to allow of a lateral and also a rocking movement, for the purpose of rectifying any imperfection in the running of the work in the lathe from any cause, thereby securing a perfectly true central and horizontal position of the work in the manner following, viz:

The lathe-head being in its place in the lathe, the work is fixed within the jaws $a\ a$, and held fast by the set-screws $c\ d$, fig. 2.

Since it is found, in practise, to be impossible to thus place the work in a position exactly true and horizontal, we have now only to set the lathe in motion to render its imperfect position apparent. In order to correct this, we now hold a spirit-lamp under the lathe-head, allowing its flame to come in contact therewith, for the purpose of softening the wax $w$ in the chamber, at the same time keeping the lathe in rapid motion, and gently pressing the work into a true and central position, and fixing it there, by the usual well-known methods of a rest, and the cooling and consequent hardening of the wax.

The manner of operating the set-screw controlling the jaws is shown at $c$, fig. 2. Another method is shown at $d$, where the screw passes into the substance of the jaw, and forces the latter inward and outward, by turning the screw; while yet another device, and the one now in use by us, is clearly represented in fig. 3.

By the methods hitherto in use, the work itself is placed in direct contact with the wax, in consequence of which, adhering portions of the latter must be removed by a resort to the spirit-bath, causing delay and expense, all of which is avoided by the use of my invention.

I do not claim the use of wax for correcting the centre, or the running of the work in the lathe, when the wax is used in contact with the work; but What I do claim, and desire to secure by Letters Patent of the United States, is—

The combination of the solid-necked head-block A, annular screw-rim C, and the screw-socket attachment B, provided with the chamber for the wax, when constructed and operating substantially in the manner described.

In testimony that I claim the foregoing, I have hereunto set my hand, this 1st day of June, A. D. 1869.

LYSANDER S. HILL.

Witnesses:
THOMPSON SINCLAIR,
ISAAC W. LUCAS.